Aug. 26, 1924.
J. L. ANDERSON
1,506,038
AUTOMATIC ADJUSTER FOR TUBE WELDING MACHINES
Filed Oct. 31, 1919    2 Sheets-Sheet 1
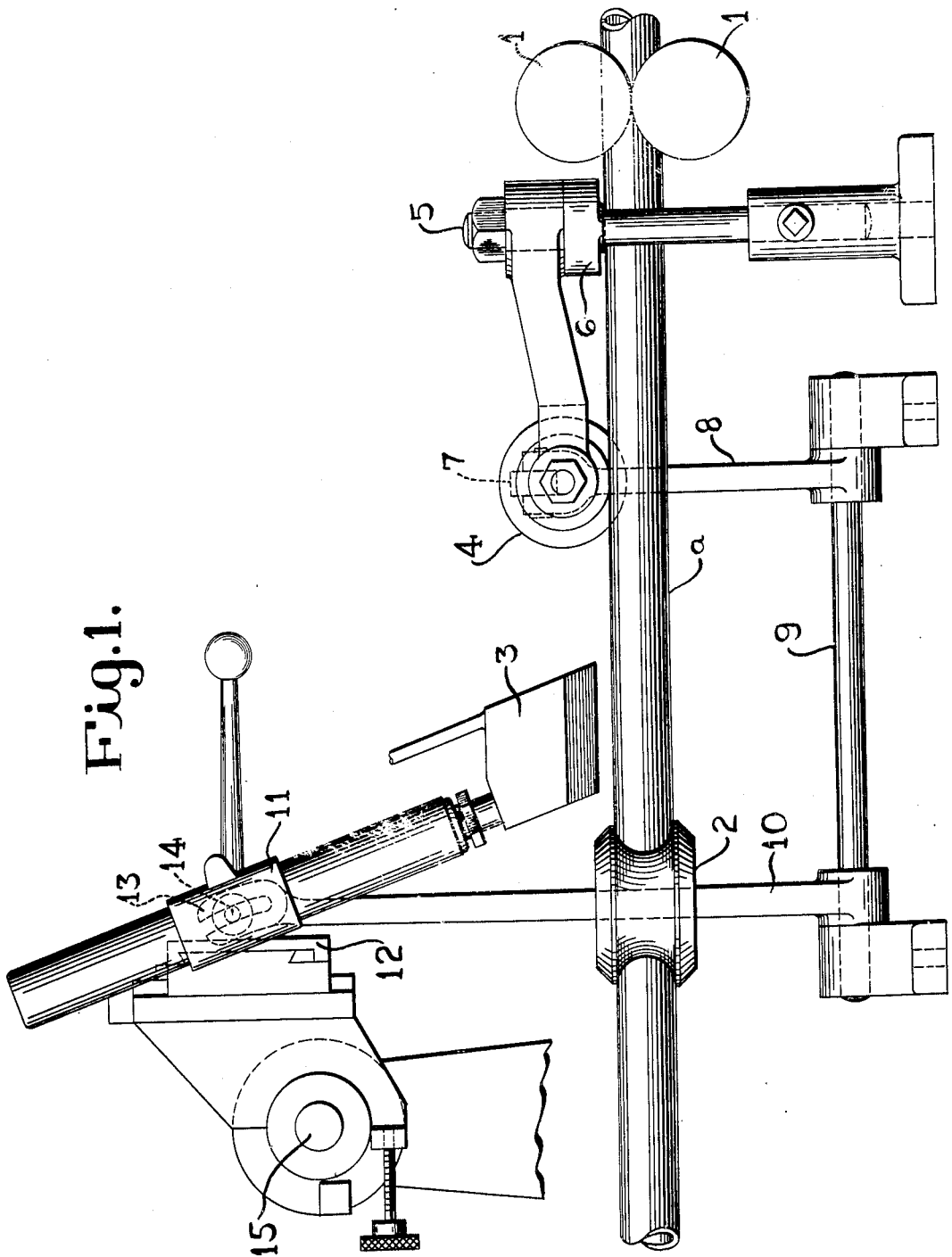
INVENTOR
James L. Anderson
BY
ATTORNEY

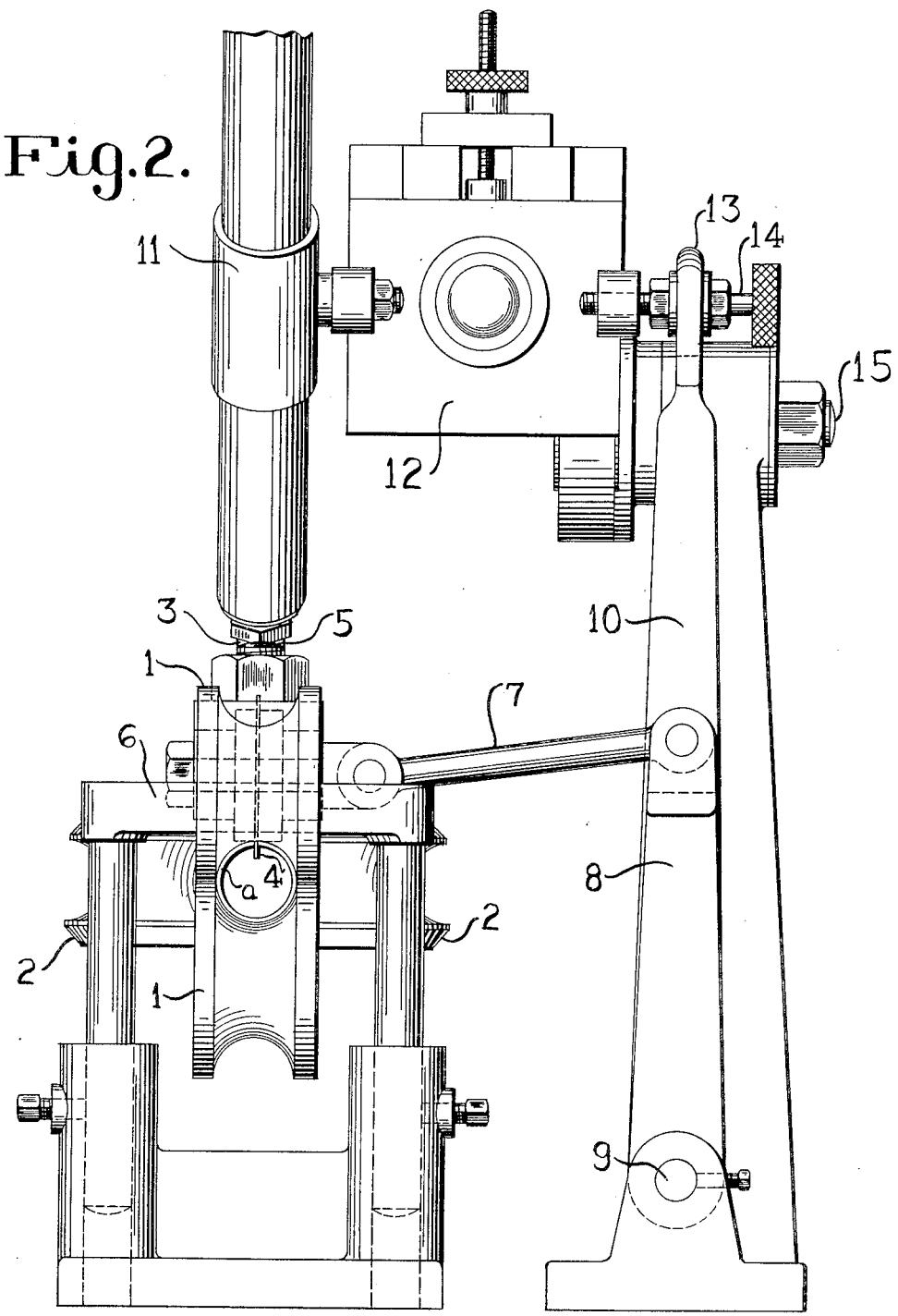

Patented Aug. 26, 1924.

1,506,038

UNITED STATES PATENT OFFICE.

JAMES L. ANDERSON, OF BAYONNE, NEW JERSEY, ASSIGNOR, BY MESNE ASSIGNMENTS, TO AIR REDUCTION COMPANY, INCORPORATED, OF NEW YORK, N. Y., A CORPORATION OF NEW YORK.

AUTOMATIC ADJUSTER FOR TUBE-WELDING MACHINES.

Application filed October 31, 1919. Serial No. 334,716.

*To all whom it may concern:*

Be it known that I, JAMES L. ANDERSON, a citizen of the United States, and resident of Bayonne, in the county of Hudson and State of New Jersey, have invented a new and useful Automatic Adjuster for Tube-Welding Machines, of which the following is a specification.

In tube-welding apparatus wherein the formed tubing with open or unwelded seam is driven beneath a torch or heater, the natural twist in the tubing causes the seam to move from side to side as it passes under the heater, requiring manual adjustment of the torch, which is exacting and frequently fails to preserve the relation with sufficient accuracy to insure good welding. According to the present invention means are provided whereby the heating device is shifted laterally by and in accordance with deviations of the seam.

In the accompanying drawings, forming a part hereof:

Fig. 1 is a side elevation, showing schematically means for driving and holding the tube in transit; and Fig. 2 is a front elevation on a larger scale.

The tube $a$ is driven, guided, held, and compressed, if desired by sets of grooved rolls, represented by a pair of grooved feed rolls 1 on horizontal axes, and a pair of rolls 2 on vertical axes behind the heater 3. Said heater may be an oxyacetylene torch intended to fuse the edges to be united, and the rolls 2 can be used to compress the edges together or not as the case may be. In any event a proper relation between the heater or welder and the seam is desired, which is likely to be lost owing to lateral deviations of the seam as explained.

To overcome this difficulty a feeler, desirably in the form of a rotatable disk 4 is supported at an appropriate point in the open seam, said feeler being connected with the heating device so as to shift the same laterally in accordance with the direction of the seam. In the particular construction illustrated the feeler is journaled on the end of a laterally swinging arm over the course of the tube, pivoted at 5 on a supporting frame 6. A pivotal link 7 connects the feeler-arm with an arm 8 on a longitudinal rock-shaft 9; and another upward-extending arm 10 on this shaft acts upon the torch-support 11, which is shiftable laterally. The torch-support may be of the kind disclosed in my application filed September 3, 1919, Serial No. 321,301, and includes a horizontal slide 12. Lateral movement of the arm 10 compels lateral movement of this slide, and thereby of the torch. The upper end of the arm 10 is desirably forked as shown at 13 in such manner that the pin 14 which it engages can escape from it when the holder is swung upward and back out of the way about the pivot 15. It will be understood that the rollers 2 which hold the tube are mounted on fixed axes, as usual, such axes being capable of manual adjustment in the ordinary manner, but not yielding to lateral movement of the tube as a whole. That is to say, the holding means confines the tube to a fixed path in operation, while the feeler and welder are capable of moving with the rotational movement or twisting of the seam relative to the holding means.

The relations and proportions of the parts are such, it will be understood, that lateral movement of the feeler caused by the seam traveling off to one side or the other will produce an appropriate lateral movement of the heater to preserve its action upon the seam. Manifestly the parts can be brought closer together than, for convenience, they have been shown. Numerous changes can, of course, be made and a variety of embodiments produced within the scope of the invention as set forth in the appended claims.

What I claim as new is:

1. In tube-welding apparatus, comprising means for driving and fixed means for holding the tube in transit and a device for heating the traveling edges, a feeler positioned to stand in the open part of the seam, and connections between the feeler and the heating device to cause the latter to follow automatically lateral deviations in the seam due to twisting, the automatic movements of the feeler and heating device being relative to the fixed holding means.

2. In tube-welding apparatus, the combination of fixed-position tube-holding means, a laterally movable torch-holder adjacent said tube-holding means, a feeler to enter the open part of the seam, a support for the feeler permitting lateral movement thereof, and linkage connecting the feeler and torch-holder.

3. In a tube-welding machine, the combination of a welding torch, means for gripping the tube adjacent to the torch, and means including a feeler cooperative with the open seam for moving the torch relatively to the gripping means.

JAMES L. ANDERSON.